Figure 1:
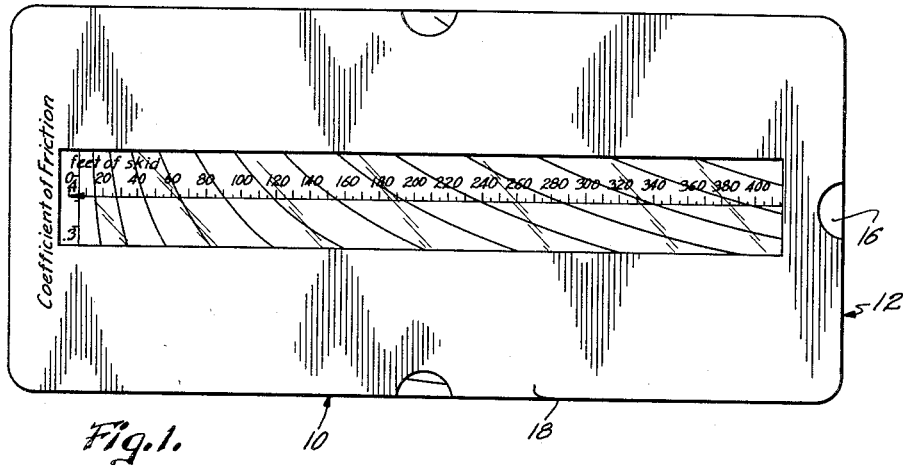

March 13, 1962 C. J. HALLEY, JR., ET AL 3,024,979
DEVICE FOR POST-DETERMINATION OF VEHICLE SPEED
Filed April 20, 1959 2 Sheets-Sheet 1

INVENTOR.
Clay J. Halley Jr.
Bryce B. Wilde
BY
ATTORNEY

March 13, 1962 C. J. HALLEY, JR., ET AL 3,024,979
DEVICE FOR POST-DETERMINATION OF VEHICLE SPEED
Filed April 20, 1959 2 Sheets-Sheet 2

INVENTOR.
Clay J. Halley Jr.
Bryce B. Wilde
BY
ATTORNEY

United States Patent Office 3,024,979
Patented Mar. 13, 1962

3,024,979
DEVICE FOR POST-DETERMINATION OF
VEHICLE SPEED
Clay J. Halley, Jr., 1923 N. Oklahoma, and Bryce B.
Wilde, 1418 Wheeler, both of Shawnee, Okla.
Filed Apr. 20, 1959, Ser. No. 807,468
10 Claims. (Cl. 235—61)

This invention relates to an instrument for permitting determination of the speed of a vehicle involved in an accident or the like and utilizing physical evidence at the scene of such accident, the primary object being to provide a simple and inexpensive device for post-determination of the speed of a vehicle at the time an attempt was made to stop the same by locking of the wheels thereof and employing skid mark measurements obtained from the surface upon which the vehicle was stopped.

In accident litigation involving vehicles, one of the most difficult facts to actually prove is the speed of each of the vehicles which collided at the time that the brakes of each vehicle were applied. The self-serving testimony of the participants to the accident has been extremely unreliable, and witnesses at the scene of an accident generally cannot give an accurate estimate of the speed at which each individual vehicle was moving at the time the brakes thereof were locked upon the driver becoming aware of the potential danger. Investigating officers have heretofore measured the skid marks left by the locked wheels of a vehicle during a "panic" stop thereof, and the length of such marks has been introduced in evidence by oral testimony, but these facts in themselves have not been of sufficient value to clearly indicate the speed of the vehicle at the time such panic stop commenced.

Many different tables of "stopping distances" have previously been published, but the same have disagreed widely, thus causing investigators to be reluctant to place confidence in skid mark evidence. It has now been found that skid mark evidence is reliable in indicating the speed of the vehicle at the time the brakes were locked if the coefficient of friction for the particular surface on which the vehicle was braked is determined at the time of the accident.

It is therefore another important object of the invention to provide an instrument for facilitating determination of the coefficient of friction of a particular surface upon which a vehicle is braked to a stop by locking of the wheels thereof and further, an instrument which may also be utilized to find the vehicle speed at the time of locking of such wheels when the coefficient of friction of the roadbed is established along with the length of skid marks left by the tires as the same slide across the surface.

A still further object of the invention is to provide an instrument permitting rapid determination of the coefficient of friction of a particular road surface by braking a test vehicle to a stop on such surface and measuring the skid marks left by the locked wheels, whereby the defined coefficient of friction may be determined from the instant device by virtue of the fact that the velocity of the test vehicle at the time of locking of the brakes thereof may be read from the speedometer. By determining the coefficient of friction of the surface at a time as soon after the accident as possible, it can be seen that the velocity of the vehicle involved in such accident may be determined with great accuracy, since the conditions are substantially the same for the test vehicle as well as the accident car.

An equally important object of the invention is to provide a device of the character referred to above which may be constructed of relatively inexpensive materials such as cardboard, die cut to proper configuration and interconnected by adhesive or the like, whereby the overall cost of the unit is low and permitting widespread distribution of the instruments for use by all law enforcement and safety agencies.

Also an important aim of the invention is to provide an instrument constructed of the materials set forth above wherein the components thereof are of especial configuration to permit shifting of various members of the instrument relatively without binding or hanging up of the shiftable members as the same are moved with respect to the main carrier of the instrument.

Other important objects and details of construction of the present instrument will become obvious or be explained in greater detail as the following specification progresses.

Figure 2:
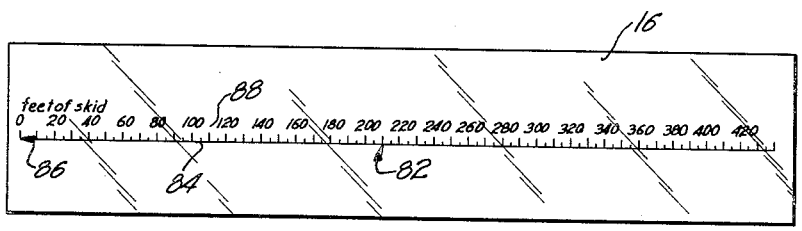
Figure 3:
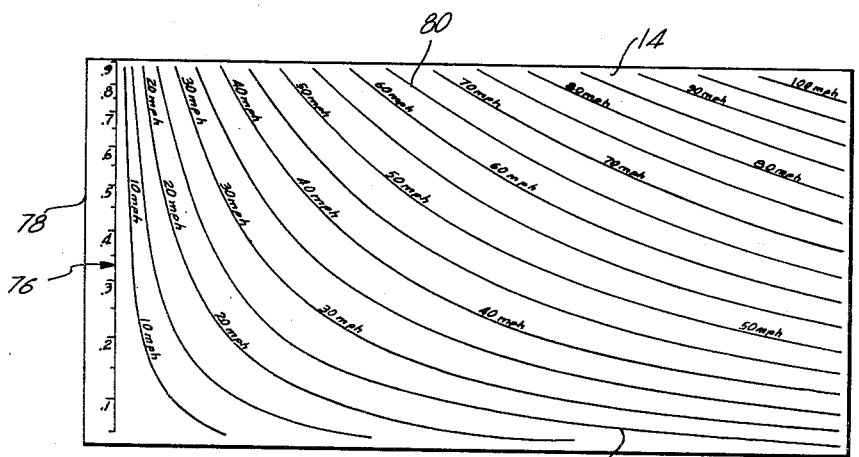
Figure 4:
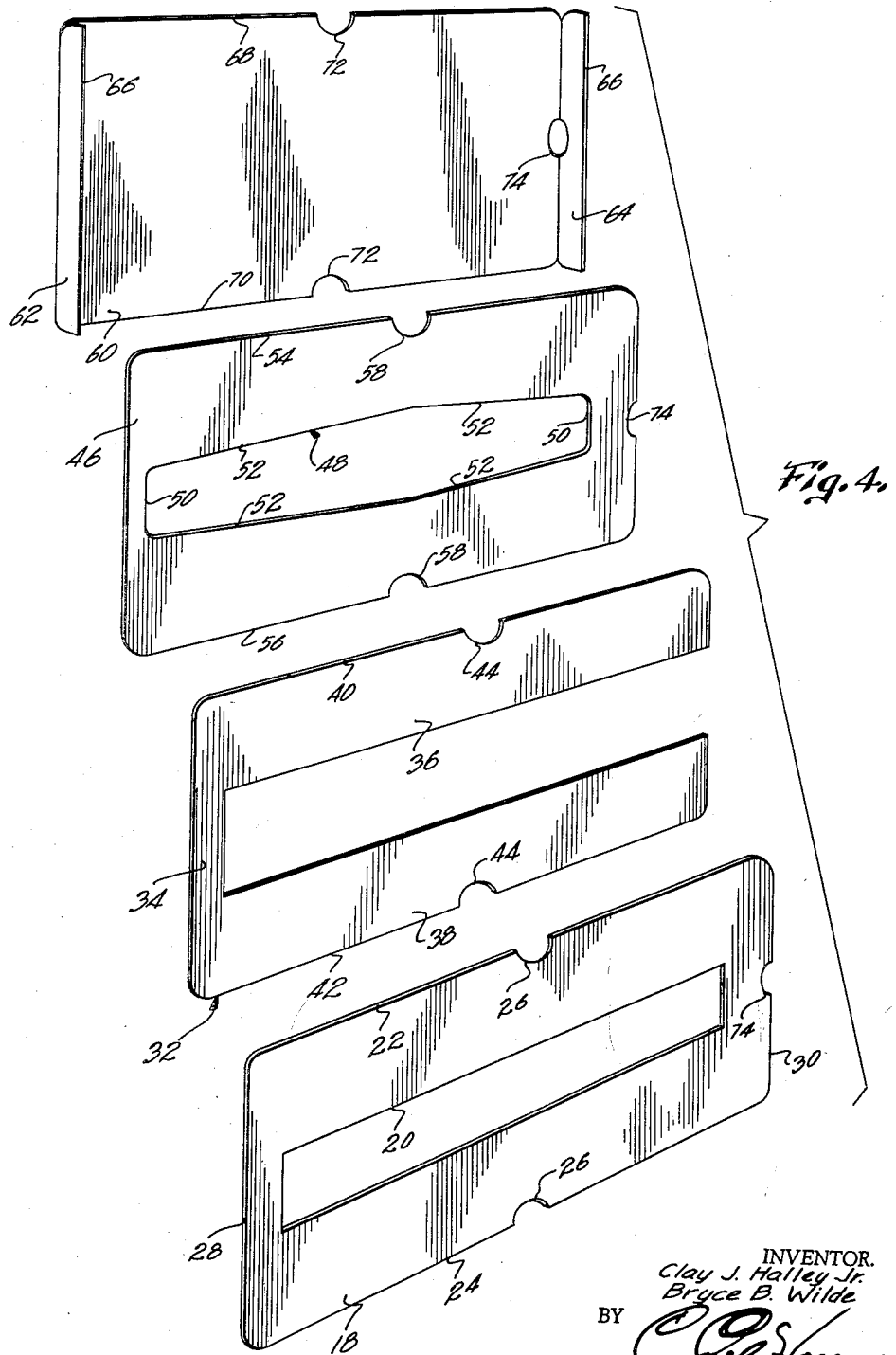

In the drawings:
FIGURE 1 is a front elevational view of an instrument for post-determination of vehicle speeds and embodying the concepts of the instant invention;
FIG. 2 is a front elevational view of the transparent strip forming a part of the instrument and slidable longitudinally of the main carrier thereof;
FIG. 3 is a front elevational view of the coefficient of friction and speed curves member shiftably carried by the main carrier and movable relative to the transparent strip illustrated in FIG. 2; and
FIG. 4 is an exploded, perspective view of the various components constituting the carrier of the instrument for slidably receiving the speed curves member and the transparent strip defined above.

The instrument broadly numerated 10 in the drawings and adapted for permitting post-determination of the speed of a vehicle at the time an attempt was made to stop the same by locking of the wheels thereof, includes a main carrier designated 12 serving to slidably receive a rectangular coefficient of friction and speed curves member 14, as well as a transparent strip 16 of generally rectangular configuration and coextensive in length with member 14.

Carrier 12 comprises a main front cover panel 18 of generally rectangular shape, with the corners thereof rounded to prevent fraying of the same during utilization of instrument 10 and having a longitudinally extending, rectangular opening 20 therein substantially intermediate longitudinal edges 22 and 24 of panel 18. Edges 22 and 24 of panel 18 are provided with transversely aligned, curved finger notches 26 substantially medianly disposed opposite end margins 28 and 30 of panel 18.

Positioned immediately behind cover panel 18 is a substantially U-shaped sheet 32 having a bight portion 34 normally adjacent end margin 28 of panel 18, as well as a pair of parallel, spaced legs 36 and 38 of substantially the same length as panel 18. It is to be pointed out that the distance between opposed margins of legs 36 and 38 is substantially equal to the width of transparent strip 16, whereby the opposed margins of legs 36 and 38 serve as guides for restricting strip 16 to a substantially rectilinear path of travel extending longitudinally of carrier 12. The outer edges 40 and 42 of legs 36 and 38 also have inwardly extending, transversely aligned finger notches 44 therein which are aligned with notches 26 when the components of carrier 12 are assembled.

Baffle 46 of generally similar configuration to cover panel 18 is disposed immediately behind sheet 32 and is provided with a window 48 therein of substantially elliptical configuration. Window 48 is not of true elliptical shape in that the same has upright, relatively straight end edge segments 50 interconnected by corresponding, longitudinally extending, inner edge segments 52 positioned so that the same are in greatest spaced relationship exactly intermediate end edge segments 50. The length of end edge segments 50 is somewhat less than the width of strip 16 and thereby the distance between opposed guide margins of legs 36 and 38, while the space between the zone of juncture of respective inner edge segments 52 is greater than the transverse dimension of strip 16. Opposed, longitudinally extending edges 54 and 56 of baffle 46 also have inwardly extending, transversely aligned finger notches 58 which are normally aligned with notches 44 and 26 respectively.

Rear cover panel 60 has a pair of opposed flaps 62 and 64 at opposite ends thereof and which are adapted to be bent over into engagement with the face of panel 60 normally proximal to baffle 46, whereby opposed margins 66 of flaps 62 and 64 present parallel guides for limiting shifting movement of member 14 to a rectilinear path of travel, since it is contemplated that the distance between margins 66 of flaps 62 and 64 be substantially equal to the length of member 14. Opposed edges 68 and 70 of panel 60, extending longitudinally thereof, additionally have inwardly extending, transversely aligned finger notches 72 therein which align with notches 58, 44 and 26.

The components of carriage 12 are assembled by interconnecting the same with glue or other adhesive normally placed along the ends of respective components and thereby at or adjacent end margins 28 and 30 of panel 18, bight 34 of sheet 32, as well as the ends of legs 36 and 38, the end edges of baffle 46 and on both sides of the flaps 62 and 64.

In order to facilitate shifting movement of strip 16, it is to be preferred that end margin 30 of cover panel 18, an end margin proximal thereto of baffle 46, and the end of cover panel 60 adjacent flap 64 be provided with inwardly extending finger notches 74 which also are in alignment upon assembly of carrier 12. In this manner the end of strip 16 may be grasped within notches 74 to permit shifting of strip 16 as required.

After adhesive interconnection of the components of carrier 12, member 14 is merely shifted into the space presented between baffle 46 and the innermost face of cover panel 60, and strip 16 is moved into the area defined between opposed inner edges of legs 36 and 38 of sheet 32.

Member 14 is provided with a coefficient of friction scale 76 on one face thereof adjacent an end margin 78 of the same and also with a plurality of speed curves 80 representing the stopping distance of a vehicle in correlation with the coefficient of friction of the surface upon which the vehicle is being braked. Each curve 80 represents a stopping distance for that particular speed through the drag factor or coefficient of friction set forth in scale 76. It is thus apparent that speed curves 80 are correlated with scale 76 so that any point on any curve 80 is spaced from scale 76 a distance proportional to that from any other point on any curve 80 relative to scale 76, based on the coefficient of friction of the surface upon which the vehicle is being braked and the speed of the vehicle having the wheels thereof locked.

Strip 16 has a feet of skid scale 82 and including an elongated line 84 extending longitudinally of strip 16 and provided with an arrow 86 at the end thereof normally proximal to scale 76 of member 14, as well as a plurality of transversely extending, equally spaced marks 88 representing feet of skid and also correlated with speed curves 80 and coefficient of friction scale 76, as will be explained hereinafter.

With instrument 10, the investigator can readily establish the coefficient of friction, or drag factor, for any braking surface or condition. In an accident situation with skids on several different surfaces, the drag factor for each condition can be found, and then the speed at each point in the accident, as well as the original speed, can be found. The terms "coefficient of friction" and "drag factor" are used interchangeably because drag factor is coefficient of friction plus slope. On level stretches of roadway, slope would be zero and therefore, drag factor becomes coefficient of friction.

To find the drag factor or coefficient of friction for any situation, the investigator should drive a vehicle over substantially the same route as was followed by the vehicle involved in the accident and with the skid marks left by the locked wheels of the test vehicle being carefully measured. Also, the velocity of the test vehicle should be noted at the time that the wheels are locked to simulate a panic stop. The speed at which the test vehicle should be driven to establish the test skid marks will necessarily vary for the road condition, but experience has shown that speeds within the range of 20 to 30 miles per hour are normally satisfactory. The longest skid left in the test stop is the measurement utilized in determining the drag factor or coefficient of friction, as indicated on scale 76.

In utilization of instrument 10 to determine such coefficient of friction, the length of the skid mark is found on strip 16 with the zero point of line 84 positioned on the vertical line of scale 76, and then member 14 is reciprocated between flaps 62 and 64 until the line coinciding with the speed of the vehicle at the time of locking of the brakes thereof crosses line 84 of feet of skid scale 82 at a point corresponding to the measured skid mark from the test stop. The arrow 86 points to the coefficient of friction of scale 76 for that particular surface, or the drag factor if there is a slope, whether the skidding was uphill or downhill.

In many accidents, the vehicle involved skidded across differing surfaces as from pavement onto a grass or gravel shoulder. To make a test stop to establish a drag factor for skids left with one side of the vehicle on one surface and the other side on some other surface, it has been found not to be necessary to drive the test vehicle at an angle; the vehicle should simply be driven with one side of the car on each surface. Thus, even though when a vehicle is traveling from one surface to another, there is a short distance when only one wheel is on the second surface, then for some distance, two wheels will be on each surface, and finally, there will be a time when three wheels are on the second surface, this problem is solved by virtue of the fact that the drag factor will equal the average coefficient of friction, namely, that determined when two wheels of the vehicle are on each surface.

The simplest use of instrument 10 is in the interpretation of a skid to a stop with little or no impact and with all skidding on one surface and slope or condition. For this use, all that is necessary is to set arrow 86 of line 84 at the coefficient of friction on scale 76 as determined from the test stop described above, and then read across feet of skid scale 82 to the point corresponding to the measured skid marks left by the vehicle involved in the accident. The velocity of such vehicle at the time of locking of the brakes thereof is indicated by the speed curve which crosses line 84 at the point corresponding to the length of the observed skid marks.

When the accident vehicle skidded from a paved surface for example, onto a grass shoulder, the test stops for all of the different surfaces should be made as outlined above and as soon after the accident as practicable to prevent introduction of error into the calculations.

For purposes of illustration, it may be assumed that the accident vehicle left a skid mark 82 feet long on pavement, 49 feet long with the right wheels skidding on a shoulder and 50 feet long with both wheels on such shoulder. It is further assumed from evidence at the scene that the accident vehicle was traveling at 25 miles per hour at the time of impact. Test stops on the various surfaces gave results of skid marks 33 feet long from 20 miles per hour on the shoulder, skid marks 25 feet long at 20 miles per hour half on and half off of the shoulder, and skid marks 47 feet long from 30 miles per hour on the paving. The coefficients of friction or drag factor for the individual surfaces may thereby be calculated as follows. Setting the zero point of line 84 on strip 16 in alignment with the vertical coefficient or drag factor line 76, member 14 is shifted until speed curve 80 representing 20 miles per hour is in alignment with the mark representing skid marks 33 feet long. In this manner, the drag factor is determined to be 0.4. Member 14 is again shifted until speed curve 80 for 20 miles per hour is in alignment with the numeral on scale 82 representing skid marks 25 feet long, whereby it can be seen that the drag factor will be 0.55. The final factor is obtained by shifting member 14 to align speed curve 80 representing 30 miles per hour into alignment with the mark on scale 82 representing skid marks 47 feet long and thereby obtaining a drag or coefficient of friction factor of .65.

Calculation of the initial velocity of the accident vehicle at the time of locking of the brakes thereof, is made by the following steps. The zero of the feet of skid scale 82 is initially aligned with the last drag factor obtained, namely, 0.65, by shifting of member 14 to correct position, and then strip 16 is reciprocated so that the zero point thereof is in alignment with the speed curve 80 representing 25 miles per hour, the impact speed of the accident vehicle. The speed at the beginning of skidding on the shoulder may then be calculated by observing the speed curve which is in alignment with the mark 88 of scale 82 representing a skid mark 50 feet long. This speed curve will be found to be 35 miles per hour.

Member 14 is again shifted so that arrow 86 points to the second drag factor obtained, namely, 0.55, and then the zero point on scale 82 is shifted into alignment with the speed curve 80 representing 35 miles per hour. The speed at the start of the skid on the pavement and shoulder both is observed as the speed curve 80 crossing scale 82 at the mark 88 corresponding to 49 feet, the length of the skid partially on the pavement and partially on the shoulder. This speed will be found to be 45 miles per hour.

The final calculation is accomplished by shifting member 14 so that the zero point of scale 82 is aligned with the coefficient of friction or drag factor of 0.4 and the zero point of scale 82 is then shifted into alignment with 45 miles per hour curve 80. The initial speed of the vehicle is indicated by the speed curve 80 which crosses scale 82 at the point representing a skid mark 82 feet long as set forth above. This will be found to be 60 miles per hour, or the speed at which the brakes were originally locked.

Instrument 10 is also of value in driver and safety education classes and further, may be utilized to test brakes of vehicles such as multi-axle trucks or the like, to determine if the brakes thereof meet legal requirements.

Although the preferred embodiment of the present instrument has been illustrated and described in detail, it is to be understood that changes may be made in details of construction thereof without departing from the spirit of the invention and it is therefore intended to be limited only by the scope of the appended claims.

Having thus described the invention what is claimed as new and desired to be secured by Letters Patent is:

1. An instrument for post-determination of the speed of a vehicle at the time an attempt was made to stop the same by locking of the wheels thereof and utilizing skid mark measurements obtained from the surface upon which said vehicle was stopped, said instrument including a carrier; a member shiftably mounted on said carrier and provided with a coefficient of friction scale on one face thereof and a plurality of speed curves representing stopping distance and correlated with said scale so that any point on any curve is spaced from said scale a distance proportional to that from any other point on any curve to said scale based on the coefficient of friction of said surface and the speed of the vehicle having the wheels thereof locked; and transparent means movably mounted on said carrier in overlying relationship to said member and shiftable relative thereto, said means having a feet of skid scale thereon correlated with said speed curves and the coefficient of friction scale whereby the speed of the vehicle at the time of locking of the wheels thereof may be determined by aligning said feet of skid scale with the coefficient of friction value of said surfaces and observing the point of intersection of said feet of skid scale with one of said speed curves corresponding to the length of said skid marks.

2. An instrument as set forth in claim 1 wherein the member and said means are movable relatively along paths of travel intersecting at substantially right angles.

3. An instrument as set forth in claim 1 wherein said carrier includes a pair of cover panels interconnected at a pair of opposed margins thereof to present slots at other opposed edges thereof receiving the member to permit sliding movement of the latter relative to said cover panels, one of said cover panels having an elongated opening therein exposing the coefficient of friction scale and the speed curves on said member to external view.

4. An instrument for post-determination of the speed of a vehicle at the time an attempt was made to stop the same by locking of the wheels thereof and utilizing skid mark measurements obtained from the surface upon which said vehicle was stopped, said instrument including a carrier comprised of a pair of cover panels interconnected at a pair of opposed margins thereof to present slots at the other opposed edges thereof; a member disposed on said carrier within the slots thereof for movement relative to the cover panels and provided with a coefficient of friction scale on one face thereof and a plurality of speed curves representing stopping distance and correlated with said scale so that any point on any curve is spaced from said scale a distance proportional to that from any other point on any curve to said scale based on the coefficient of friction of said surface and the speed of the vehicle having the wheels thereof locked, one of said cover panels having an elongated opening therein exposing the coefficient of friction scale and the speed curves on said member to external view; and a transparent strip on said carrier in overlying relationship to said member and shiftable relative thereto, said strip having a feet of skid scale marked thereon correlated with said speed curves and the coefficient of friction scale, the cover panel normally adjacent said one face of the member having structure thereon for slidably receiving said strip and restricting movement of the latter to a path of travel at right angles to that of the member, whereby the speed of the vehicle at the time of locking of wheels thereof may be determined by aligning said feet of skid scale with the coefficient of friction value of said surfaces and observing the point of intersection of said feet of skid scale with one of said speed curves corresponding to the length of said skid marks.

5. An instrument as set forth in claim 4 wherein is provided baffle means interposed between said structure and the member, secured to said cover panel adjacent said opposed margins thereof and having a window therein to permit viewing of said one face of the number externally of the carrier, said window being configured to prevent engagement of any of the edges of said member with said structure during sliding movement of the member.

6. An instrument as set forth in claim 5 wherein said window is of relatively elliptical configuration.

7. An instrument as set forth in claim 4 wherein said structure comprises a substantially U-shaped sheet and having a bight section and a pair of elongated, parallel legs spaced apart a distance substantially equal to the width of said strip to thereby guide the same along a substantially rectilinear path of travel.

8. An instrument as set forth in claim 7 wherein the transverse dimension of said opening is less than the width of said strip and thereby the distance between said legs of the sheet.

9. An instrument as set forth in claim 8 wherein said cover panels, the sheet and said baffle means are provided with inwardly extending, aligned finger notches in opposed edges thereof adjacent said slots to permit grasping of one margin of the member to facilitate shifting thereof within the carrier.

10. An instrument as set forth in claim 9 wherein corresponding margins of the cover panel at one end thereof have inwardly extending, aligned finger notches therein to permit grasping of one end of said strip to facilitate shifting thereof.

References Cited in the file of this patent

UNITED STATES PATENTS

| 2,152,604 | Perry | Mar. 28, 1939 |
| 2,219,429 | Osterberg | Oct. 29, 1940 |
| 2,495,777 | Schroeder | Jan. 31, 1950 |

FOREIGN PATENTS

| 444,099 | Great Britain | Mar. 13, 1936 |
| 1,098,319 | France | Mar. 2, 1955 |